United States Patent Office 3,275,618
Patented Sept. 27, 1966

3,275,618
PROCESSES FOR PREPARING ALKYLENE DIISO-CYANATES AND INTERMEDIATES THEREFOR
James N. Tilley, Hamden, Henri Ulrich, Northford, and Adnan A. Sayigh, North Haven, Conn., assignors, by mesne assignments, to The Upjohn Company, Kalamazoo, Mich., a corporation of Delaware
No Drawing. Filed June 7, 1962, Ser. No. 200,617
22 Claims. (Cl. 260—239)

The present invention relates generally to processes for making organic compounds and to new organic compounds thereby produced. In addition it relates generally to the production of valuable organic compounds from such new organic compounds, including a number of such valuable organic compounds which heretofor were not readily and conveniently obtainable, if at all.

More specifically it is concerned with processes for making N,N'-alkylene-bridged cyclic allophanyl chlorides by the reaction of the corresponding N,N'-alkylene-bridged cyclic ureas with phosgene and the new compounds thereby produced, of which certain N,N-(1,2-alkylene)cyclic allophanyl chlorides and process for making them is an especially preferred embodiment. It is concerned also with a new and improved process for making diisocyanates from our new N,N'-alkylene-bridged cyclic allophanyl chlorides, of which the production of certain lower molecular weight alkylene diisocyanates is also an especially preferred embodiment.

According to Siefkin as of about the year 1948 (Mono- and Polyisocyanates, Liebig's Annalen, vol. 562, page 76 at pages 84 to 87), the few of the aliphatic diisocyanates described in the literature were, with but a sing'e exception, synthesized by azide degradation, known as the Curtius method. The exception, pentamethylene diisocyanate, was obtained by Braun (Berichte, vol. 45, page 2199 (1912)) from diiodopentane and silver cyanate.

Other diisocyanates prepared by the Curtius method included ethylethylene diisocyanate and phenylethylene diisocyanate which were described as not distillable without decomposition (Curtius, J. pr. Chemie, vol. 125 (1930), 71 at page 83, also page 234). Similarly, ethylene diisocyanate was prepared from succinoyldiazide by Schroeter and Seidler ( J. pr. Chemie, vol. 105 (1922/23), page 165) as well as by Curtius and Hectenberg (J. pr. Chemie (1922/23), page 300), while hexamethylene diisocyanate was made from suberoyldiazide by Schmidt (J. pr. Chemie, vol. 105 (1922/23), page 300).

Still, according to Siefkin, the phosgenation of the aliphatic diamine hydrochlorides which as of the date of his paper has assertedly not been previously described in literature did not yield the corresponding diisocyanate except for those diamines having at least four carbon atoms separating the two amino groups. Thus ethylene diamine and trimethylene diamine hydrochlorides were reported as not being attached by phosgene, so that in order to obtain ethylene diisocyanate and trimethylene diisocyanate it was necessary to resort to the azide degradation (Curtius reaction).

Even in the case of those diamines that can be phosgenated to the diisocyanate, their hydrochlorides are insoluble in almost all of the inert solvents, so that the phosgenation has to proceed in a non-homogeneous system. To shorten the reaction time, it is necessary for the amine hydrochloride to be in suspension in finely divided form and for the reaction to be carried out at a higher temperature than is generally used in the case of the monoamine hydrochlorides. The higher the temperature and the longer the residence time the more the yield is adversely affected, that is, the more polymeric material is formed. Other precautionary factors reported by Siefkin are avoidance of undue concentration of materials in the inert solvent which favors the formation of polymeric materials and a preference for orthodichlorobenzene (B.P. 160 to 180° C.) as inert solvent over the lower boiling monochlorobenzene (B.P. 130° to 140° C.), in which the diamine hydrochlorides react very slowly with phosgene at the boiling temperature.

Other difficulties reported by Siefkin which were encountered in the phosgenation of aliphatic diamines having from four to twelve carbon atoms to the molecule, as carried out by Siefkin and his coworkers, was the presence in the diisocyanate products of chlorine-containing impurities which persisted in the product on repeated fractionations despite an observed constant boiling point. This was especially so in the case of the hexamethylene diamine, where the impurity was identified as the 1-chlorohexylisocyanate. The formation of the chloroalkyl isocyanates on phosgenation of the diamine hydrochlorides was said to be unpreventable, with the amount of the impurity being from 5 to 10 percent.

The formation of the chlorine-containing impurities in the phosgenation of the diamine hydrochlorides is also in accord with our own experience.

The present invention in one embodiment thereof is based on our discovery that lower aliphatic diisocyanates, which heretofore were not readily attainable except with considerable difficulty, if at all, can now be conveniently produced in good yield and at reasonable cost by decomposition of our new N,N'-alkylene-bridged cyclic allophanyl chlorides with release of hydrogen chloride therefrom.

Referring to the production of 1,2-ethylene diisocyanate from N,N'-(1,2-ethylene) allophanyl chloride as a matter of convenience in describing the invention, the reaction that takes place can be represented by the following equation:

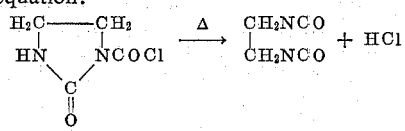

The reaction as illustrated with reference to the decomposition of N,N'-(1,2-ethylene) allophanyl chloride which is especially preferred is not limited thereto but is applicable generally to lower cyclic N,N'-alkylene-bridged allophanyl chlorides characterized by the presence of one hydrogen atom attached to a nitrogen atom of the characteristic group thereof

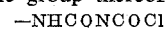

and having up to ten carbon atoms to the molecule in addition to the two carbonyl carbon atoms thereof. It is also an essential feature of our compounds that the ten carbon atom grouping, of which the alkylene-bridge is a part, is free of groups reactive with phosgene (carbonyl chloride), as for instance, free of alcoholic hydroxyl, amino, mercapto (sulfhydryl), carboxyl and the like. A chlorine atom attached directly to a carbon atom of the bridging group is not reactive with phosgene, and the presence of chlorine in the molecule attached to carbon atoms other than those directly attached to the nitrogen atoms is not excluded. Of the ten carbon atoms of this grouping at least one carbon atom, but not more than four must be in the alkylene chain joining the nitrogen atoms of the cyclic allophanyl chloride. Conformably with the foregoing, the grouping per se can be cycloaliphatic, as well as acyclic or aralkylene provided neither of the carbon atoms attached to the nitrogen atoms is aromatic. Preferably the aliphatic carbon atoms attached directly to the nitrogen atoms are non-tertiary, with primary carbon atoms being the more preferred. By the terms tertiary, secondary and primary carbon atoms as used herein with reference to the carbon atoms attached directly to the nitrogen atoms are meant those with none, one and two hydrogen atoms, respectively, also attached thereto.

Representative of our new allophanyl chlorides and the alkylene diisocyanates which can be made therefrom by our process are the following:

| Allophanyl Chloride | Diisocyanate |
| --- | --- |
| Methylene | Methylene. |
| Ethylidine | Ethylidine. |
| Dimethylene | 1,2-ethylene. |
| Propylene | 1,2-propylene. |
| Trimethylene | 1,3-propylene. |
| 1,2-cyclopropyl | Cyclopropane-1,2. |
| 4-methylene ethylene | 1-methylene-1,2-ethylene. |
| Tetramethylene | 1,4-butylene. |
| 1,2-cyclobutyl | Cyclobutane-1,2. |
| 5-methylene trimethylene | 2-methylene-1,3-propylene. |
| 4-methyl trimethylene | 1,3-butylene. |
| 4-ethylethylene | 1,2-butylene. |
| 4,5-dimethyl ethylene | 2,3-butylene. |
| 5-methyl trimethylene | 2-methyl-1,3-propylene. |
| 4-methylene trimethylene | 1-methylene-1,3-propylene. |
| 4-methyl tetramethylene | 1,4-pentylene. |
| 4-ethyl trimethylene | 1,3-pentylene. |
| 4-propyl ethylene | 1,2-pentylene. |
| 4,6-dimethyl-trimethylene | 2,4-pentylene. |
| 4,5-dimethyl-trimethylene | 1,2-dimethyl-1,3-propylene. |
| 5,5-dimethyl-trimethylene | 2,2-dimethyl-1,3-propylene. |
| -ethyl trimethylene | 2-ethyl-1,3-propylene. |
| 1,3-cyclopentyl | Cyclopentane-1,3. |
| 1,2-cyclopentyl | Cyclopentane-1,2. |
| 4-ethyl tetramethylene | 1,4-hexylene. |
| 4-propyl trimethylene | 1,3-hexylene. |
| 4-butyl ethylene | 1,2-hexylene. |
| 4-methyl-5-propyl ethylene | 2,3-hexylene. |
| 4-methyl-6-ethyl trimethylene | 2,4-hexylene. |
| 4,7-dimethyl tetramethylene | 2,5-hexylene. |
| 4,5-diethyl ethylene | 3,4-hexylene. |
| 1,2-cyclohexylene | 1,2-cyclohexane. |
| 1,3-cyclohexylene | 1,3-cyclohexane. |
| 1,4-cyclohexylene | 1,4-cyclohexane. |
| 4-phenylethylene | Phenyl-1,2-ethylene. |
| 5-phenyl trimethylene | 2-phenyl-1,3-propylene. |

According to our experience the conversion of the cyclic allophanyl chloride to the diisocyanate is best carried out in the presence of an inert solvent. In order to minimize undesired reactions of the diisocyanate product during the reaction period, it will be found advantageous not to use a too highly concentrated solution or reaction mixture especially when high temperature is employed. Good results have been obtained with a concentration based upon a proportion of from about 1 to 25 percent of the cyclic allophanyl chloride in the solution by weight; that is, an amount of solvent which is from about 3 to 99 times the weight of the cyclic allophanyl chloride. A proportion of solvent which is about 5 to 7.5 times the weight of the cyclic allophanyl chloride is preferred.

Representative of the inert solvents that can be used are the following:

Non-polar:
  benzene
  toluene
  biphenyl
  naphthalene
  alpha-methylnaphthalene
  beta-methylnaphthalene
  high boiling petroleum fractions
Polar:
  chloroform (most polar)
  methylene chloride
  ethylene dichloride
  trichloroethane
  tetrachloroethane
  monochlorobenzene
  orthodichlorobenzene
  trichlorobenzenes
  chlorotoluenes
  chlorobiphenyls
  dichlorobiphenyls
  chloronaphthalenes
  dialkylethers
  tetrahydrofuran Of these the polar solvents are preferred over the non-polar solvents and of both the polar and non-polar solvents those having a normal boiling point in and about the range of from 130° to 250° C. are preferred over those normally boiling at lower temperatures. However, where it is desired to use a particular solvent at a reaction temperature above its normal boiling point, as for instance in the case of the lower boiling solvents, the process can be carried out under super atmospheric pressure.

The use in the reaction mixture of a catalyst-scavenger for the hydrogen chloride by-product has been found by us to give good results, where it is desired to speed up the reaction rate at a particular reaction temperature over that normally obtaining. The advantage of using a catalyst-scavenger will be the more noticeable, however, in carrying out the reaction at temperatures in the lower ranges as for instance below 130° to 150° C. where its use is recommended. By the term catalyst-scavenger for the hydrogen chloride, as used herein, is meant an acceptor for the hydrogen chloride by-product, as for instance, the tertiary amines, of which the following are representative:

trimethylamine
triethylamine
methyl, ethyl tertiary amine
tripropyl amines
tributyl amines
methyl, ethyl, propyltertiary amine
methyl, butyl tertiary amines
collidine
dimethyl aniline
diethyl aniline
methyl, ethyl pyridine Of these the more weakly basic tertiary amines of which collidine is exemplary can be used without necessarily resorting for best results to stoichiometric amounts; that is the amount theoretically required to react with all the hydrogen chloride by-product. The more strongly basic the tertiary amine, as for instance, the lower tertiary alkyl amines, the less its tendency to yield up or release continuously the hydrogen chloride with which it has combined. The weaker amines of which collidine is representative is preferred.

In carrying out our process we have used temperatures from as low as 0° C. to as high as 250° C. with good results. Temperatures above 250° C. can be also employed but the temperature in any case should not be so high in the endeavor to speed up the reaction as to favor decomposition of the diisocyanate product. Usually it will be unnecessary to resort to temperatures above 250° to 300° C. in that no commensurate increase in reaction rate is thereby achieved. The reaction rate is to a degree temperature dependent in the sense that the lower the temperature employed, as for instance below about 150° C., the rate also tends to diminish to the extent that it is advantageous to employ in the reaction mixture a catalyst-scavenger for the hydrogen chloride. With weaker tertiary amines, as for instance collidine, a reaction temperature in the range of about 0° to 150° C. is preferred.

Our new lower aliphatic cyclic, or lower N,N'-alkylene-bridged, allophanyl chlorides useful in making, by our new process, the heretofor difficulty attainable lower alkylene diisocyanates, can themselves be readily and conveniently produced in good yield by the reaction of the corresponding lower aliphatic cyclic, or lower N,N'-alkylene-bridged, ureas with phosgene. By the term, lower aliphatic cyclic urea or lower N,N'-alkylene-bridged urea as used herein is meant a lower cyclic urea having from four to seven members in the ring of which three ring members are present in the characteristic group; —NHCONH—, with each nitrogen atom thereof having one hydrogen atom attached thereto and with the remaining ring member or members being only aliphatic carbon atoms, not more than four in number but at least one.

The reaction that takes place between such lower aliphatic cyclic ureas and phosgene (carbonyl chloride) can be represented by the following equation, here again referring specifically to N,N'-(1,2-ethylene) allophanyl chloride, a preferred embodiment, as a matter of convenient illustration in more fully describing the invention:

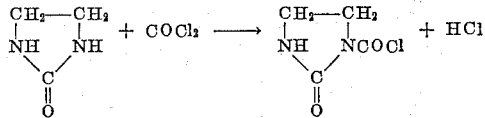

The reaction is not limited in its usefulness to the production of N,N'-(1,2-ethylene)allophanyl chloride but is applicable generally to the preparation of lower N,N'-alkylene-bridged allophanyl chlorides from the corresponding N,N'-alkylene-bridged ureas having from one to ten carbon atoms to the cyclic urea molecule, in addition to the carbonyl carbon atom of the characteristic group, —NHCONH—, and which except for such characteristic group is free of other groups reactive with phosgene, as for instance free of alcoholic hydroxyl, amino, mercapto, (sulfhydryl) carboxyl and the like. A chlorine atom attached directly to a carbon atom which is itself not attached directly to a nitrogen is not reactive under the conditions of the reaction, and the presence of such chlorine atoms is not excluded. Stated in other words the process is applicable generally to the production of lower cyclic allophanyl chlorides from the corresponding lower aliphatic cyclic ureas in which the allophanyl chloride or the urea have a total of not more than twelve or eleven carbon atoms to the molecule, respectively, of which two or one carbon atoms, as the case may be, are the carbonyl carbons of the respective characteristic groups, —NHCONCOCl
         | and —NHCONH—, with from one to four carbon atoms of those remaining being aliphatic and constituting the bridge between the two nitrogen atoms. Subject to the foregoing the non-ring carbon atoms associated with the alkylene link not exceeding nine in number in both the cyclic allophanyl chloride, and the cyclic urea from which it is made, can be aliphatic, including alkylene and cycloaliphatic, aralkyl, aralkylene and aryl, provided none but aliphatic groups are attached directly to the nitrogen atoms.

Representative of the lower aliphatic cyclic allophanyl chlorides and the corresponding lower aliphatic cyclic ureas from which they can be made by our process are the following, the naming of the bridging grouping being the same for both.

| Cyclic Urea and Cyclic Allophanyl Chloride | Cyclic Urea and Cyclic Allophanyl Chloride |
|---|---|
| N,N'-methylene. | N,N'-(4,5-dimethyl) ethylene. |
| N,N'-(4-methyl)methylene; (N,N'-ethylidine). | N,N'-(5-methyl) trimethylene. |
| N,N'-(1,2-ethylene); (N,N'-dimethylene). | N,N'-(4-methylene) trimethylene. |
| N,N'-(4-methyl) ethylene; (N,N'-(1,2-propylene)). | N,N'-(4-methyl) tetramethylene. |
| N,N'-trimethylene. | N,N'-(4-ethyl) trimethylene. |
| N,N'-(1,2-cyclopropyl). | N,N'-(4-propyl) ethylene. |
| N,N'-(4-methylene) ethylene. | N,N'-(4,6-dimethyl) trimethylene. |
| N,N'-(1,4-butylene); (N,N'-tetramethylene). | N,N'-(4,5-dimethyl) trimethylene. |
| N,N'-(1,2-cyclobutyl). | N,N'-(5,5-dimethyl) trimethylene. |
| N,N'-(5-methylene)trimethylene. | N,N'-(5-ethyl)trimethylene. |
| N,N'-(4-methyl)trimethylene. | N,N'-(1,3-cyclopentyl). |
| N,N'-(4-ethyl)ethylene. | N,N'-1,2-cyclopentyl. |
| N,N'-(4-ethyl)tetramethylene. | N,N'-(4,5-diethyl)ethylene. |
| N,N'-(4-propyl)trimethylene. | N,N'-(1,2-cyclohexylene). |
| N,N'-(4-butyl)ethylene. | N,N'-(1,3-cyclohexylene). |
| N,N'-(4-methyl-5-propyl)ethylene. | N,N'-(1,4-cyclohexylene). |
| N,N'-(4-methyl-6-ethyl)trimethylene. | N,N'-(4-phenyl)ethylene. |
| N,N'-4,7-dimethyl tetramethylene. | N,N'-(5-phenyl)trimethylene. |

Using substantially equimolar amounts of the cyclic urea and of the phosgene, the reaction proceeds smoothly with almost quantitative yields of the corresponding cyclic allophanyl chloride. Hydrogen chloride is evolved, indicating that the reaction is taking place. An excess of phosgene can be used if desired, but no matter how much the excess employed, it does not react with the hydrogen atom of the characteristic allophanyl chloride group, —NHCONCOCl
         | according to our studies and tests. Also according to our tests, the reaction is best carried out in the presence of an inert solvent for the cyclic urea, of which the following solvents are representative:

chloroform
methylene chloride
trichloroethane
polychloro lower alkanes
chlorobenzene
dichlorobenzene
trichlorobenzenes
dioxane
tetrahydrofurane
benzene
toluene
xylenes
ligroin
lower dialkyl ethers having up to eight carbon atoms to the alkyl group thereof:
    dimethyl ether
    diethyl ether
    dipropyl ethers
    dibutyl ethers
    dioctyl ethers
    mixed lower dialkyl ethers The procedures that can be employed for bringing about the reaction of the cyclic urea and the phosgene are not narrowly critical, and involve primarily a mixing of the two reactants in accord with well-established principles and techniques for carrying out chemical reactions. By way of illustration, each dissolved in, or diluted with, a solvent can be introduced either continuously or stepwise into a reaction vessel or flask. This reaction vessel itself can, if desired, first be charged with an amount of inert solvent or diluent. Alternatively, the phosgene can be passed as a gas into a reaction flask already charged with solvent and into which the cyclic urea is being introduced at the same time.

When all of the reactants have been added the reaction mixture can be heated to facilitate completion of the reaction and to expel any remaining traces of hydrogen chloride by-product, together with any unreacted phosgene, especially if the latter were used in excess. A stream of inert gas, as for instance nitrogen, can also be used to aid in sweeping out the hydrogen chloride and phosgene.

The temperature at which the reaction can be carried out is not narrowly critical. We have used temperatures ranging from 0° to 80° C. with good results. Temperatures below 0° C. can also be used if desired without noticeably affecting the rate of reaction adversely. Temperatures above 80° C. can also be used, particularly if it is desired to proceed directly from the cyclic urea to the alkylene diisocyanate without recovering the cyclic allophanyl chloride intermediate as such, following the procedure described above for making the lower alkylene diisocyanate.

Although all of our new lower alkylene cyclic allophanyl chlorides can be used for the production of the corresponding lower alkylene diisocyanates, heretofore not readily attainable if at all, those cyclic allophanyl chlorides having, in addition to the two carbonyl carbon atoms of the characteristic group,

—NHCONCOCl from one to four carbon atoms are preferred. Especially preferred is N,N'-dimethylene allophanyl chloride.

The examples that follow are illustrative.

EXAMPLE 1

*Preparation of N,N'-ethylene allophanyl chloride*

Into a 4-neck 500 milliliter reaction vessel equipped with a heating mantle, a gas inlet tube, a reflux condenser, a thermometer, a stirrer and a graduated addition funnel was charged 100 milliliters of dry ethylene dichloride. Into the addition funnel, which also had provision for heating it and its contents, was introduced a hot solution of 8.6 grams (0.1 mole) of ethylene urea in 200 milliliters of dry ethylene dichloride maintained at a temperature of about 70° to 80° C. by heating the funnel. Phosgene was then passed into the ethylene dichloride in the reaction vessel over a period of 28 minutes until a total of about 10 grams (0.1+ mole) had been introduced, with the temperature of the contents of the vessel being maintained at 60° to 70° C. and with the temperature of the reflux condenser being maintained at about —40° C. to —60° C. by means of carbon dioxide snow ("Dry Ice"). At the same time the phosgene was being introduced, the hot urea solution was also added in about 10 milliliter increments at approximately one minute intervals so that the addition of all the urea was completed at the end of the 28 minutes. From interval to interval the reaction mixture alternately produced a precipitate and clouded up; evolved hydrogen chloride gas and cleared up. The evolution of hydrogen chloride gas was copious, evidencing that a reaction took place. At the end of the 28 minutes the solution remained somewhat cloudy indicating the presence of ethylene urea in the form of its hydrochloride. Accordingly, about one gram of phosgene, in addition, was introduced, amounting to about a 10 percent excess and the reaction mixture heated under gentle reflux at a temperature of about 80 to 90° C. for another 10 to 15 minutes.

The hot solution, which was faintly cloudy, was then purged with nitrogen, and finally cooled to a temperature of 5° to 10° C. There was deposited from the solution 11.2 grams of N,N'-ethylene allophanyl chloride, in the form of a first crop of fine crystals, corresponding to 75.4 percent of theory based on the ethylene urea. The crystals had a melting point of 154–155° C. Two more crops were obtained on concentration of the mother liquor: 1.2 grams melting at 150° to 152° C. and 0.4 gram melting at 145° to 150° C., corresponding to yields of 8.1 percent and 2.7 percent of theory respectively. The total yield was 12.8 grams for a yield of 86.2 percent of theory. A recrystallized sample had a melting point of 156° to 157° C. and was found upon analysis to have the following composition: carbon, 32.06 percent; hydrogen, 3.35 percent; nitrogen, 19.0 percent. Calculated for $$C_4H_5N_2ClO_2$$

carbon, 31.9; hydrogen, 3.34; nitrogen, 18.7.

EXAMPLE 2

*Preparation of N,N'-(1,2-propylene) allophanyl chloride*

A run was carried out similar to that described in Example 1 using instead of 1,2-ethylene urea, a solution of 10 grams (0.1 mole) of 1,2-propylene urea in 100 milliliters of ethylene dichloride. Phosgene 10 grams (0.1 mole) was passed into the reaction vessel containing 100 milliliters of ethylene dichloride. The reaction vessel was similar to that used in Example 1 and the N,N'-(1,2 propylene) urea solution was supplied from a heated addition funnel maintained at a temperature of 72 to 77° C. Evolution of hydrogen chloride indicated that a reaction was taking place. After the addition of the reactants was completed the heating was continued and the reaction mixture purged of hydrogen chloride by a stream of nitrogen. After filtering the solution hot, and allowing it to cool, there was obtained a crop of crystals of N,N'-1,2-propylene urea (methylethylene urea) amounting to 9.5 grams for a yield 58.4 percent of theory. The crystals melted at 145° to 146° C. and analyzed as follows: carbon, 36.90; hydrogen, 4.44; nitrogen, 16.42. Calculated for $C_5H_7ClN_2O_2$: carbon, 36.92; hydrogen, 4.34; nitrogen, 17.23.

EXAMPLE 3

*Preparation of ethylene diisocyanate from N,N'-(1,2-ethylene) allophanyl chloride*

A suspension of 14.9 (0.1 mole) of N,N'-(1,2-ethylene) allophanyl chloride in about 20 times its weight (350 milliliters) of benzene was charged to a reaction vessel and held at a temperature of about 30 to 33° C. while 10 grams (0.099 mole) of triethyl amine was added dropwise over a period of about twenty minutes. Thereafter the reaction mixture was heated at a temperature of about 40° to 45° C. (below its boiling point) for a period of about one hour under a cooled condenser. Thereafter, the reaction mixture was cooled to about 10° C. and a precipitate that formed which was triethylamine hydrochloride was filtered off. The filtrate was then heated to a temperature of 70° C. and phosgene passed into it. A solid material precipitated which was filtered off and discarded.

Upon distillation of this filtrate and separation of the benzene, there was obtained 6.6 grams of ethylene diisocyanate having a boiling point of 77° to 80° C. at a reduced pressure of 16 millimeters of mercury, absolute. The infrared spectrum of the product was identical with that of a sample of ethylene diisocyanate prepared by the azide degradation method and also having a boiling point of 77° to 80° C. at a reduced pressure of 16 millimeters of mercury, absolute. The yield of ethylene diisocyanate based on the N,N'-(1,2 ethylene) allophanyl chloride was 59 percent of theory.

EXAMPLE 4

*Preparation of ethylene diisocyanate*

A solution of 14.9 grams (0.1 mole) of N,N'-(1,2 ethylene) allophanyl chloride dissolved in about 40 times its weight (600 milliliters) of trichlorobenzene was heated to a temperature of about 200° to 220° C. and the infrared spectra of the solution was taken at 15 minute intervals. Gaseous hydrogen chloride was evolved showing that a reaction was taking place. The intensity of the C=O band at 5.52; 5.53μ was observed to diminish over a heating period of about 30 to 40 minutes at which time complete dissociation of all of the N,N'-(1,2 ethylene) allophanyl chloride had been indicated. The intensity of the band at 4.45μ (NCO) indicated the formation of ethylene diisocyanate. The ethylene diisocyanate thus obtained had a boiling point of 77° to 80° C. under a reduced pressure of 16 millimeters of mercury, absolute, and was identical in physical and chemical properties with ethylene diisocyanate made in other examples.

EXAMPLE 5

*Preparation of ethylene diisocyanate*

In another run somewhat similar to that of Example 3 except for the use of a weakly basic catalyst-scavenger, 14.9 grams (0.1 mole) of N,N'-(1,2-ethylene) allophanyl chloride dissolved in about forty times its weight, about 550 milliliters, of chlorobenzene was heated to a temperature of about 130° C. About 0.5 gram of collidine was also added to the reaction mixture as catalyst-scavenger for the hydrogen chloride. Hydrogen chloride was evolved showing that a reaction was taking place. Infrared spectra of the solution were taken at intervals of fifteen minutes to one hour over a period of about six hours and at the end of that time the dissociation of the N,N'-(1,2-ethylene) allophanyl chloride was complete as indicated by the disappearance of the C=O band at 5.52; 5.53μ, and at the same time the production of ethylene diisocyanate in quantitative yield was indicated by the intensity of the band at 4.45μ (NCO). The diisocyanate product distilled at a temperature of 77° to 80° C. at a reduced pressure of 16 millimeters of mercury, absolute. Its boiling point at atmospheric pressure was 175° C. The physical and chemical properties were identical with those of ethylene diisocyanate of the other examples.

EXAMPLE 6

*Preparation of 1,2-propylene diisocyanate*

Following the procedures of Examples 3 and 4 but at a lower temperature and with the use of a more strongly basic catalyst-scavenger, about 16.3 grams (0.1 mole) of N,N'-(1,2-propylene) allophanyl chloride was dissolved in about 20 times its weight (350 milliliters), of benzene, and charged to a reaction vessel. Over a period of about 10 to 20 minutes 10.0 grams (0.1 mole) of triethylamine was added dropwise to the stirred benzene solution with the temperature of the solution rising to a temperature of 35° C. from an initial temperature of about 31 to 32° C. After the mixture was stirred for another hour while heated on a water bath at a temperature of 35° to 45° C. it was cooled to a temperature of about 10° to 15° C. A precipitate of triethylamine hydrochloride formed which was filtered off, and washed with two 25-milliliter portions of benzene. The benzene filtrates were combined and phosgenated to convert any remaining excess of triethylamine to its hydrochloride which was filtered off. The benzene solution was then concentrated in vacuo to a pale yellow oil which was crude 1,2-propylene diisocyanate, amounting to 13 grams. Upon distillation of the crude product there was obtained 8.7 grams of pure 1,2-propylene diisocyanate in the form of a clear, colorless liquid boiling at 81° C. and 70° C. under reduced pressures of 19 and 12.5 millimeters of mercury, absolute, respectively. Its index of refraction was ($n_D^{24}$) 1.4407. The yield was 69 percent of theory.

We claim:

1. A process for making lower alkylene diisocyanate in which the two isocyanate groups thereof are separated by not more than four carbon atoms and which has not more than twelve carbon atoms to the alkylene diisocyanate molecule, which comprises reacting phosgene with N,N'-alkylene-bridged urea having a total of eleven carbon atoms to the molecule to form the corresponding N,N'-alkylene-bridged allophanyl chloride and heating such N,N'-allophanyl chloride to cause evolution of hydrogen chloride therefrom to form said alkylene diisocyanate.

2. A process for making lower N,N'-alkylene diisocyanate in which the two isocyanate groups thereof are separated by not more than four carbon atoms and which has not more than twelve carbon atoms to the alkylene diisocyanate molecule wherein phosgene is reacted with N,N'-alkylene-bridged urea having from four to seven members in the cyclic urea ring in the presence of an inert diluent and at a temperature of about 0° to 80° C. to form the corresponding N,N'-alkylene-bridged allophanyl chloride having the characteristic group,

—NHCONCOCl and thereafter heating such N,N'-alkylene-bridged allophanyl chloride in the presence of an inert diluent at a temperature below about 250° C. sufficient to release hydrogen chloride therefrom and thereby form the said N,N'-alkylene diisocyanate.

3. A process for making ethylene diisocyanate which comprises reacting phosgene with N,N'-ethylene urea to form N,N'-ethylene allophanyl chloride and thereafter heating such allophanyl chloride at a temperature below about 250° C. sufficient to release hydrogen chloride and thereby form the ethylene diisocyanate.

4. A process for making ethylene diisocyanate which comprises reacting phosgene with N,N'-ethylene urea in the presence of an inert solvent therefor and at a temperature from about 0° C. to 80° C. to form N.N'-ethylene allophanyl chloride and thereafter heating such N,N'-ethylene allophanyl chloride at a temperature below about 250° C. sufficient to release hydrogen chloride therefrom and thereby form said ethylene diisocyanate.

5. A process for making propylene diisocyanate which comprises reacting with phosgene N,N'-propylene urea to form the corresponding N,N'-propylene allophanyl chloride and thereafter heating such N,N'-propylene cyclic allophanyl chloride at a temperature below about 250° C. sufficient to release therefrom hydrogen chloride and thereby form said propylene diisocyanate.

6. A process for making propylene diisocyanate which comprises reacting phosgene with N,N'-propylene urea in the presence of an inert solvent therefor and at a temperature from about 0° C. to 80° C. to form N,N'-propylene allophanyl chloride and thereafter heating such N,N'-propylene allophanyl chloride at a temperature below about 250° C. sufficient to release hydrogen chloride therefrom and thereby form said propylene diisocyanate.

7. A process for making butylene diisocyanate which comprises reacting with phosgene N,N'-butylene urea to form the corresponding N,N'-butylene allophanyl chloride and thereafter heating such N,N'-butylene allophanyl chloride at a temperature of about 0 to 250° C. to release hydrogen chloride and thereby form said butylene diisocyanate.

8. A process for making butylene diisocyanate which comprises reacting phosgene with N,N'-butylene urea in the presence of an inert solvent therefor and at a temperature from about 0° to 80° C. to form N,N'-butylene allophanyl chloride and thereafter heating such N,N'-butylene allophanyl chloride at a temperature below about 250° C. sufficient to release hydrogen chloride therefrom and thereby to form said butylene diisocyanate.

9. A compound having the formula:

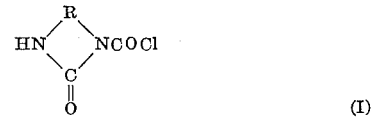

(I)

wherein R consists of a divalent hydrocarbon radical of not more than 10 carbon atoms having a saturated chain of from 1 to not more than 4 carbon atoms between the valences.

10. N,N'-methylene allophanyl chloride.
11. N,N'-ethylene allophanyl chloride.
12. N,N'-(4-methylethylene) allophanyl chloride.
13. N,N'-trimethylene allophanyl chloride.
14. N,N'-tetramethylene allophanyl chloride.
15. N,N'-(5,5-dimethyltrimethylene) allophanyl chloride.

16. An N,N'-alkylene-bridged allophanyl chloride in which the alkylene group has from 1 to not more than 4 carbon atoms between the valences and a total of not more than six carbon atoms.

17. A process for making N,N'-ethylene allophanyl chloride which comprises reacting ethylene urea with phosgene in the presence of an inert diluent and at a temperature not substantially higher than 80° C.

18. A process for making N,N'-propylene allophanyl chloride which comprises reacting N,N'-propylene urea with phosgene at a temperature not substantially higher than 80° C. in the presence of an inert diluent.

19. A process for making N,N'-alkylene-bridged allophanyl chloride characterized by the group,

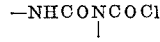
—NHCONCOCl and with from one to four carbon atoms in the alkylene bridge directly connecting the nitrogen atoms of such group, which comprises reacting with phosgene the corresponding N,N'-alkylene-bridged cyclic urea characterized by the group, —NHCOHN— in the heterocyclic ring thereof and with an alkylene bridge of from one to four carbon atoms directly connecting the nitrogen atoms thereof, said N,N'-alkylene-bridged urea said reaction being carried out in the presence of an inert solvent-diluent and at a temperature not substantially higher than 80° C.

20. A process for making N,N'-alkylene-bridged allophanyl chloride characterized by the group

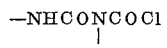

and having from four to twelve carbon atoms to the molecule with from one to four carbon atoms thereof in an alkylene bridge directly connecting the nitrogen atoms of such group, which comprises reacting with phosgene at a temperature not substantially higher than 80° C. and in the presence of an inert solvent-diluent, the corresponding N,N'-alkylene-bridged urea characterized by the group, —NHCONH—, and from two to eleven carbon atoms to the molecule with from one to four carbon atoms thereof in an alkylene bridge directly connecting the nitrogen atoms of such group,

21. The process of claim 2 in which the heating of the N,N'-alkylene-bridged allophanyl chloride is effected in the presence of an amine catalyst-scavenger for the hydrogen chloride at a reactive temperature below 150° C.

22. The process of claim 4 in which the heating of the N,N'-alkylene-bridged allophanyl chloride is effected in the presence of an amine catalyst-scavenger for the hydrogen chloride at a reactive temperature below 150° C.

References Cited by the Examiner

UNITED STATES PATENTS

| | | | |
|---|---|---|---|
| 2,292,443 | 8/1942 | Hauford | 260—453 |
| 2,374,136 | 4/1945 | Rothrock | 260—453 |
| 2,723,265 | 11/1955 | Stallmann | 260—453 |

OTHER REFERENCES

Belgian Patent 543,029, brevet octroye May 23, 1956 (5 pages), 260–453.

Kunze et al. German Auslegeschrift, 1,081,451 (Kl. 12022) (4 pages), May 12, 1960, 260–453.

Saunders et al., Polyurethanes: Chemistry and Technology I. Chemistry, Interscience Publishers, New York, N.Y., 1962, page 26.

ALEX MAZEL, *Primary Examiner.*

JOHN D. RANDOLPH, HENRY R. JILES, *Examiners.*

JOHN T. MILLER, ALTON D. ROLLINS,
*Assistant Examiners.*